United States Patent [19]
Maney

[11] Patent Number: 5,295,198
[45] Date of Patent: Mar. 15, 1994

[54] PATTERN IDENTIFICATION BY ANALYSIS OF DIGITAL WORDS

[75] Inventor: John J. Maney, Palm Bay, Fla.
[73] Assignee: Harris Corporation, Melbourne, Fla.
[21] Appl. No.: 257,688
[22] Filed: Oct. 14, 1988
[51] Int. Cl.$^5$ .................................................. G10L 7/02
[52] U.S. Cl. ........................................ 382/38; 382/36; 382/37; 381/43
[58] Field of Search ................ 382/36, 37, 38; 381/43

[56] References Cited

U.S. PATENT DOCUMENTS

| | | | |
|---|---|---|---|
| 4,651,341 | 3/1987 | Nakashima et al. | 382/37 |
| 4,805,225 | 2/1989 | Clark | 382/37 |
| 4,850,025 | 7/1989 | Abe | 382/37 |
| 4,852,173 | 7/1989 | Bahl | 382/37 |

*Primary Examiner*—David C. Cain
*Attorney, Agent, or Firm*—Antonelli, Terry, Stout & Kraus

[57] ABSTRACT

A method of and an apparatus for analyzing multi-bit digital words to identify their source or content. The digital words are converted to multi-bit fields, with each field being a portion of the digital word or corresponding to one or more descriptive parameters of the source. Each multi-bit field is analyzed to generate an additional multi-bit field. The additional multi-bit fields are grouped into pairs, and each pair is analyzed to generate a further multi-bit field. The further multi-bit fields are grouped into pairs. If more than one pair exists, the analyzing and grouping into pairs continues until a single pair remains, and that pair is analyzed to identify the source or content. Preferably each of the additional and further fields has the same number of bits, and each of the means for analyzing the additional and further multi-bit fields has twice that number of input bits. If the means for analyzing multi-bit fields has enough input bits, the additional and further fields could be grouped into groups larger than pairs. The analysis of the original fields can be done by comparison of each field with known bit patterns associated with known sources to determine possible sources, or by the application of the fields as the address bits to a programmable memory to select a memory location containing a source number or ID code indicative of possible sources. The subsequent analysis of pairs of fields can be the application of the pairs of fields as the address bits to a programmable memory to select a memory location containing a source number or ID code indicative of common possible sources. Each field can represent more than one parameter, and the analysis of the original fields can look for sources whose parameters closely but not exactly match those in the analyzed fields. The degree and measure of closeness required is selectable during programming of the pattern identifier. The degree of closeness need not be fixed, and the analysis of the original fields can look for the one known source whose parameters most closely match those in the analyzed fields. The method can be carried out by a digital data processor.

29 Claims, 5 Drawing Sheets

PATTERN IDENTIFICATION BY ANALYSIS OF DIGITAL WORDS

The United States government has rights in the present invention under USAF Contract F30602-86-C-0196.

BACKGROUND OF THE INVENTION

The present invention relates to the analysis of digital words to identify their source or content. These words may be part of a digital data stream, or they may be signatures consisting of a set of digital parameters measured on a signal or object. More particularly, the present invention relates to a method of and a system for analysis of multi-bit digital words to identify a pattern in the words, or to identify the signal or object on which the parameters represented by the words were measured.

Numerous systems operate by analyzing a received signal to identify the source of the signal. As one example, the entrance to a building or an industrial plant might be secured with a locking system which responds to receipt of a spoken request for admission by analyzing the received voice signal to ascertain whether the person making the request is authorized for admission. If the locking system determines that the person is authorized, then it responds by unlocking the entrance. As another example, a check sorting machine in a bank might include a sensor for scanning indicia printed on the checks to determine the identification numbers of checking accounts on which the checks are drawn. Such systems generate signatures indicative of the source of the signals. While such signatures can be identified by direct matching with known signals, matching of the signatures to known signals can be a complex undertaking, requiring considerable circuitry and electrical power and an undesirably long time. Locating any one of a number of names, numbers or other bit patterns in the digital data stream from a disk drive or communication link is an example of identifying a bit pattern directly.

SUMMARY OF THE INVENTION

The present invention is a system for analyzing digital words or signatures in order to identify patterns in the words or the signal or object on which the signature was measured. A signature word includes a digital bit field for each of a plurality of parameters that are measured on a signal or object, and that help distinguish one signal or object from another. The parameters can be based on various sensor sources, including electrical, accoustical, optical, or radar. A signature may include parameters based on data from one or a plurality of sensors. The digital words can either be signatures from a measurement system or data from any other source. Each multibit digital word is then divided into a plurality of multibit fields. Each field is analyzed, and an additional multibit field is generated as a result of each analysis of the original multibit fields. Each such additional multibit field is indicative of at least one possible signature source or pattern type. The additional multibit fields are grouped into pairs, and each pair is analyzed to reduce the number of possible signature sources. If the means for analysing multi-bit fields has enough input bits, the additional and further fields could be grouped into groups larger than pairs. This procedure is repeated until a single multibit field is obtained which identifies the signature source or pattern type. The pattern identifier is thus a tree structure of memory blocks or pattern analysers where the outputs of those lower in the tree make up the inputs of those at higher levels. A binary tree structure makes the most economical use of memory capacity, but the tree need not be binary or symmetric.

The analysis of the multibit fields can be performed in random access memories, thereby permitting ready addition and removal of recognizable sources from the memories when the list of possible sources changes. By way of example, this might occur when an employee who is to be permitted access to a controlled entrance either commences or terminates employment. If the system is to be used in an application in which changes in the possible signal sources are not to occur, as in recognizing the ten possible printed numerals on bank checks, then read only memories might be utilized. A system utilizing EEPROMs or any other programmable but non-volatile memories is advantageous since it permits alteration, as would a random access memory, and yet it retains the data without electrical power. Greatest flexibility is achieved by performing the analysis in a properly programmed data processor.

BRIEF DESCRIPTION OF THE DRAWINGS

These and other aspects and advantages of the present invention are more apparent in the following detailed description and claims, particularly when considered in conjunction with the accompanying drawings in which like parts bear like reference numerals. In the drawings:

DETAILED DESCRIPTION OF PREFERRED EMBODIMENTS

Figure 1A:
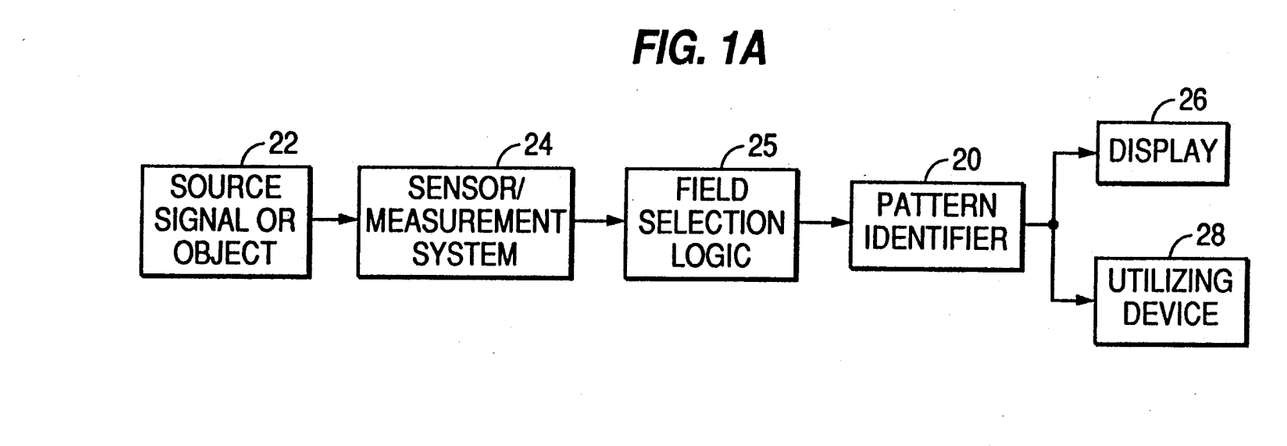
FIG. 1A is a block diagram of a system in accordance with the present invention for analyzing digital signatures to identify the source of those signatures.

In FIG. 1A a pattern identifier 20 in accordance with the present invention receives a digital signature from sensor/measurement system 24, based on the sensed characteristics of a source signal or object 22. Field selection logic 25 routes complete descriptive parameters in the signature word from sensor/measurement system 24 to pattern analyser input fields in pattern identifier 20, or they can be hardwired directly from sensor/measurement system 24 to pattern identifier 20. Pattern identifier 20 thus receives a multibit digital signal for analysis to determine the identification of signal source or object 22. The output of pattern identifier 20 can be applied to a display device 26 which displays an indication of the signal source. Alternatively, or additionally, in appropriate applications the output of pattern identifier 20 can be applied to a utilizing device 28 to actuate that utilizing device upon identification of a signal source calling for such actuation, such as unlocking a building entrance when a spoken request is identified as being from a person authorized admission to the building.

Sensor/measurement system 24 can include any desired sensors to measure characteristics of signals or objects. Sensor/measurement system 24 produces a digital output word and can include digitization and/or processing of sensor inputs.

Figure 1B:
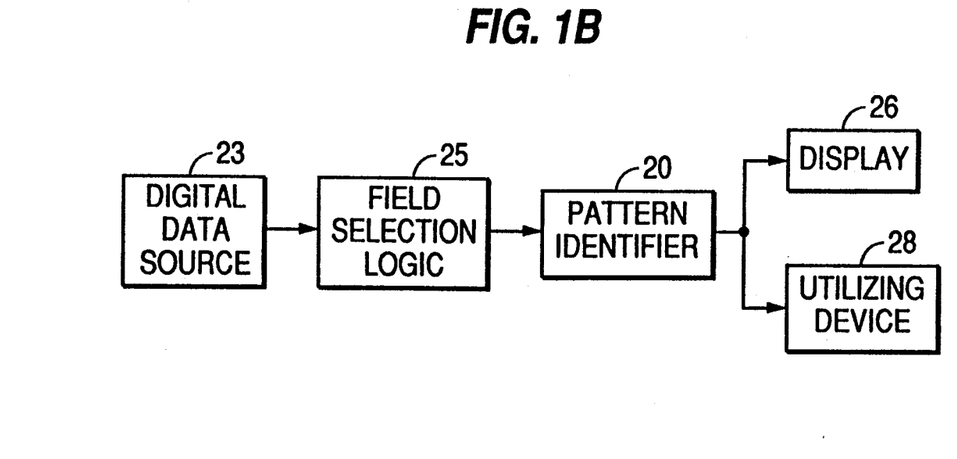
FIG. 1B is a block diagram of a system in accordance with the present invention for analyzing digital words to identify bit pa ems in the words.

In FIG. 1b a pattern identifier 20 in accordance with the present invention receives a digital word from a data source 23, which could be any form of digital storage or communication medium. If the data word includes separate descriptive parameters, the field selection logic 25 routes complete parameters in the data word from data source 25 to the pattern analyser input fields in pattern identifier 20, or they can be hardwired directly from data source 23 to pattern identifier 20. Pattern identifier 20 thus receives a multibit digital signal for analysis to determine the identification of patterns in the data from data source 23. The output of pattern identifier 20 can be applied to a display device 26 which displays an indication of the signal source. Alternatively, or additionally, in appropriate applications the output of pattern identifier 20 can be applied to a utilizing device 28 to actuate that utilizing device upon identification of a bit pattern calling for such actuation, such as retrieving a name and address from a stored address directory, or such as directing a check to a particular sorting bin.

The multibit digital signal applied to pattern identifier 20 is divided into a plurality of multibit fields. Each field becomes the input field to a pattern analyzer within pattern identifier 20. Each pattern analyzer can be a programmable memory block. The pattern analyzers may have different numbers of input bits, but each one has the same number of output data bits—eight in the example of FIG. 2.

Figure 2:
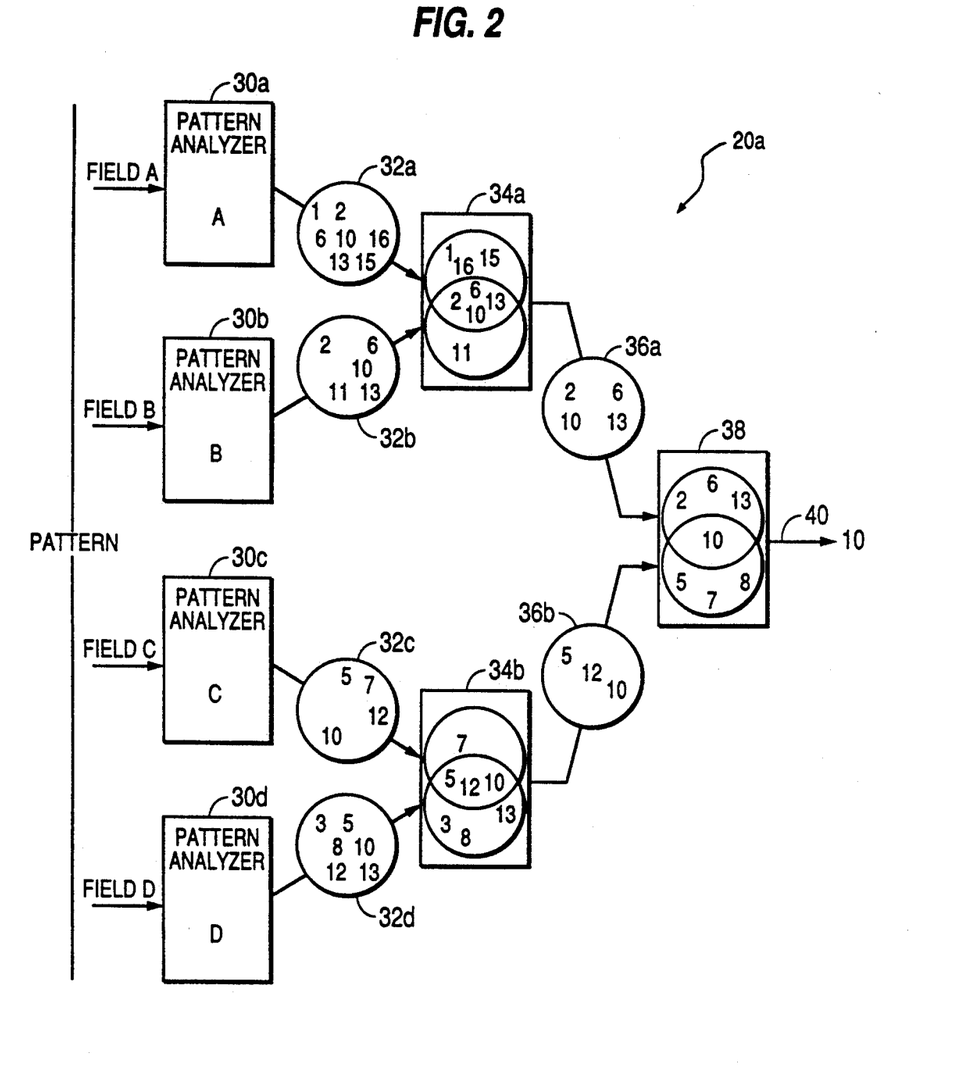
FIG. 2 is a block diagram of one embodiment of a pattern identifier suitable or use in a system in accordance with the present invention.

In the example illustrated in FIG. 2, a 64 bit signature word is divided into four fields of 16 bits each, identified as field A, field B, field C, and field D, in order to identify the source of the signature. The fields consist of bits indicative of different parameters measured by sensor/measurement system 24. Parameters in the signature word should not be split between the input fields of more than one pattern analyzer. For example, a voice actuated locking system might utilize as different parameters the voice frequency, pitch period, pattern characteristics of first spoken word (e.g., speaker's first name), and pattern characteristics of second spoken word (e.g., speaker's last name). In practice, speech recognition for such a locking system might require more than 64 bits or four fields, but for purposes of explanation of the present invention, with clarity of understanding, a method and system utilizing four fields will be considered. The eight-bit output fields of the pattern analyzers permit identification of some 255 different pattern types, and in the illustrative example of FIGS. 2, pattern identifier 20 analyzes the digital signatures to identify any one of 255 known pattern types from among the possible patterns.

The first 16 bit field, identified as field A, is applied to the input of first level pattern analyzer 30a which analyzes those 16 bits to identify possible pattern types. Pattern analyzer 30a provides on its output line 32a an 8 bit word, illustrated in FIG. 2 as indicating that the field A input bits are representative of the field A portion of the signatures from sources 1, 2, 6, 10, 13, 15, and 16. The circles are not a part of the physical system; they only illustrate what sets of pattern types the pattern analyzer output fields signify. The intersecting circles are Venn diagrams, to show how the upper level pattern analyzers intersect the sets.

In like manner, the 16 bits of field B are applied to the inputs of first level pattern analyzer 30b which analyzes those bits and, in the illustrative example of FIG. 2, provides on its output 32b an eight bit signal indicating that the 16 bit field B input signal is indicative of the field B portion of the signatures from signal sources 2, 6, 10, 11, and 13. The eight bit output from first level pattern analyzer 30a and the eight bit output from first level pattern analyzer 30b are applied to the 16 inputs of second level pattern analyzer 34a which analyzes the received signals and determines that the combined sixteen output bits of pattern analyzers A and B are indicative of sources 2, 6, 10, and 13. This determination may be made by comparing the possible signature sources identified by the pattern analyzer 30a output with the possible signature sources identified by the pattern analyzer 30b output and identifying common possible signature sources.

In like manner, the 16 bits of field C are analyzed by first level pattern analyzer 30c, and the resulting eight bit output, indicated in the representative illustration of FIG. 2 as identifying possible sources 5, 7, 10, and 12, is supplied to eight of the inputs of second level pattern analyzer 34b. Similarly, the 16 bits of field D are analyzed by first level pattern analyzer 30d which applies its eight bit output to the remaining eight inputs of second level pattern analyzer 34b. FIG. 2 illustrates the outputs of pattern analyzer 30d as indicating as possible signature sources the sources 3, 5, 8, 10, 12, and 13. Second level pattern analyzer 34b analyzes the signals supplied to it to provide a further identification of possible sources. In FIG. 2 this is illustrated as identifying sources 5, 10, and 12, and this analyzation may be the result of comparing the possible sources identified by the pattern analyzer 30c output with the possible sources identified by the pattern analyzer 30d output to determine the common possible sources.

The eight bit output from second level pattern analyzer 34a and the eight bit output from second level pattern analyzer 34b are applied by respective output lines 36a and 36b to the 16 inputs of third level pattern analyzer 38 which performs a further analysis to identify the source of the signals. This is indicated in the illustrative example of FIG. 2 as identifying source 10 as the source of the input signals making up fields A, B, C, and D. The third level analysis may be the result of comparing the possible sources identified by the output of second level pattern analyzer 34a with the possible sources identified by the output of second level pattern analyzer 34b to ascertain the common source.

Figure 3:
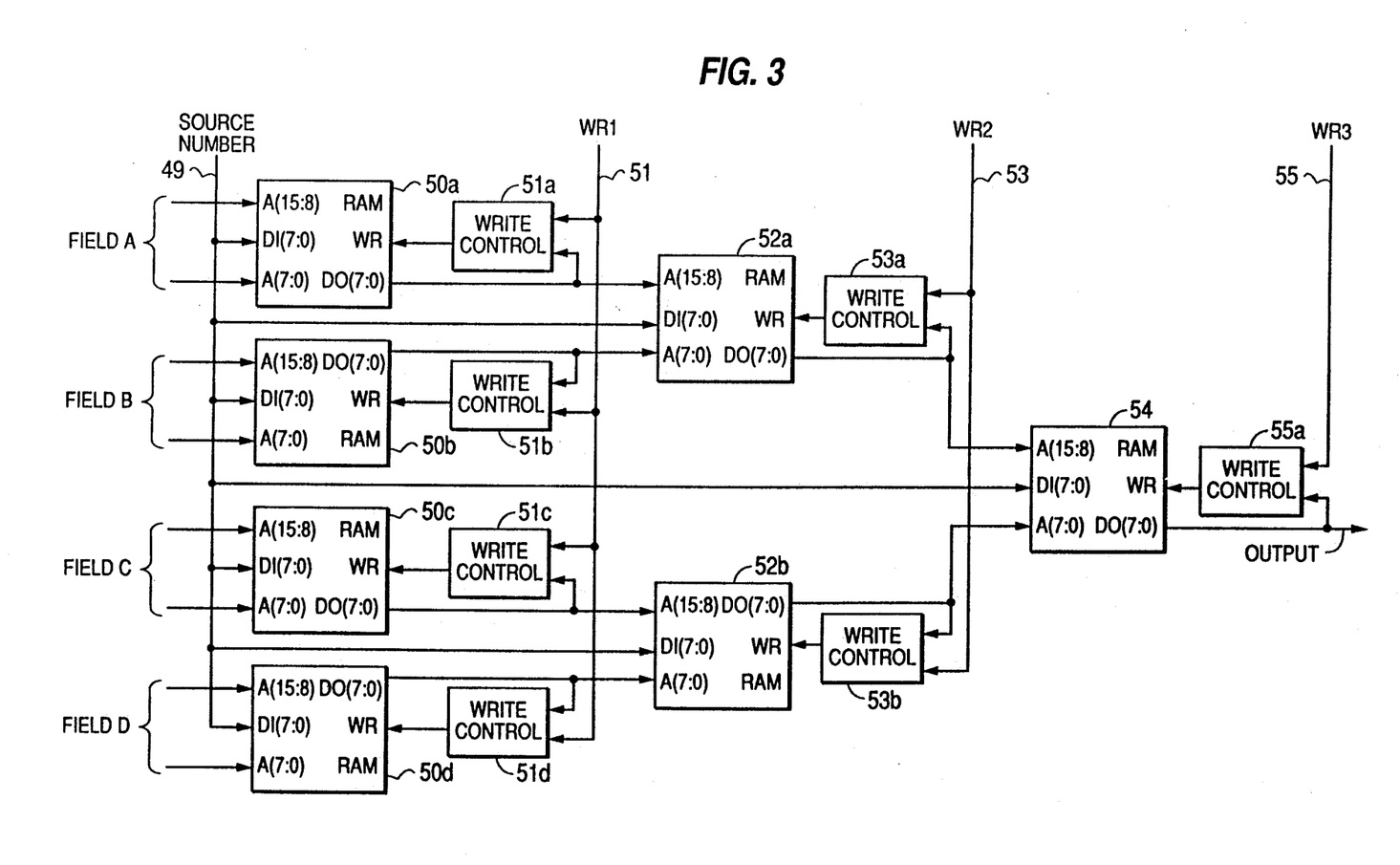
FIG. 3 is a block diagram of a preferred embodiment of a pattern identifier suitable for use in a system in accordance with the present invention.

FIG. 3 illustrates the programming of one hardware implementation of a pattern identifier 20 which operates in the manner of the general type shown in FIG. 2 and in accordance with the present invention. Each first level pattern analyser 50a–50d is made up of a 64 K×8-bit RAM block, possibly assembled as two 64 K×4-bit static RAM chips. Each 16-bit field, shown in FIG. 3 as formed of two 8-bit bytes, is applied to the address inputs of one first level RAM block 50a–50d. The identification code or source number assigned to a particular source is applied on line 49 to the data input of each first level RAM block 50a–50d. The data outputs of the first level RAM blocks 50a–50d are applied to the inputs of the second level RAM blocks 52a, 52b, in the same manner as in the first level pattern analysers 30a-30d and the second level pattern analysers 34a, 34b of FIG. 2. Each first level RAM block 50a-50d has its write control input connected to a corresponding write control circuit 51a-51d, the strobe input of which is connected to a write strobe input line 51. Each write control circuit 51a-51d has its control input field connected to the data output field of the associated first level RAM block 50a-50d.

Similarly, the source number or ID code is applied to the data input of each second level RAM block 52a, 52b and of third level RAM block 54. The data outputs of second level RAM blocks 52a, 52b are connected to the address inputs of third level RAM block 54. Second level RAM blocks 52a, 52b have their write control inputs connected to the outputs of corresponding write control circuits 53a, 53b, the strobe inputs of which are connected to write strobe input line 53 and the control inputs of which are connected to the data outputs of the associated RAM blocks 52a, 52b. The write control input of third level RAM block 54 is connected to the output of write control circuit 55a, the strobe input of which is connected to the write strobe input line 55 and the control input of which are connected to the data output of RAM block 54.

The following algorithm can be used to program the RAM blocks, with write control circuits 53, 55 and 57 omitted:

```
APPLY THE PATTERN TO THE FIRST LEVEL ADDRESS INPUTS
APPLY THE ID CODE TO ALL RAM DATA INPUTS
FOR THE FIRST, SECOND AND THIRD LEVELS
    FOR EACH RAM BLOCK IN THE LEVEL
        IF THE CONTENTS OF THE SELECTED LOCATION = 0 THEN
            WRITE THE ID CODE IN THE LOCATION
        END IF
    END FOR
END FOR
```

As set forth above, each RAM block 50a-50d, 52a, 52b, and 54 may be a 64 K×8-bit RAM block. Each of the 64 K memory locations has an address identified by a 16-bit address input. To program the pattern analyzer, an identification number assigned to a signal source or digital word to be identified is applied by line 49 to the data input of each RAM block 50a-50d, 52a, 52b, and 54. The field A-D input signals for the corresponding signal source or digital word are applied to the address inputs of the first level RAM block 50a-50d. A write strobe input signal is then applied on write strobe input line 51 to each of the first level write control circuits 51l-51d. Each of these write control circuits receives from its associated RAM block the data output from the memory location identified by the associated field input. If that data output is all binary zeros, that indicates that there is no source number then stored in the addressed memory location, and so the associated write control circuit 51a-51d enables storage at that memory location of the identification or source number on line 49. The RAM block data output then changes to that source number.

The outputs from the first level RAM blocks 50a-50d are applied as address inputs to the second level RAM blocks 52a, 52b which are also receiving the source or identification number on line 49 at their data inputs. A strobe signal is then applied by the second level write control input line 53 to write control circuits 53a, 53b. The data outputs from the memory locations identified by the address signals applied to RAM blocks 52a, 52b are applied to the corresponding write control circuits 53a, 53b. Again, if a stored binary zero indicates there is no source or identification number stored in the addressed memory location, write control circuits 53a, 53b enable storage of the source or identification number on line 49. The data outputs of RAM blocks 52a, 52b then change to that number. These data outputs are applied as the address input to third level RAM block 54 which is also receiving the source or identification number on line 49 at its data input. The data output of third level RAM block 54 is applied to the control input of third level write control circuit 55a which then receives a strobe input from third level write control input line 55. If the RAM block 54 data output indicates there is no source or identification number stored at the addressed memory location, then write control circuit 55a enables storage of the source or identification number on line 49. This programs pattern analyzer 20 by storing in the associated RAM block memory locations, as determined by the input patterns, signals indicating the source or identification number of the associated data word or signal source.

If a subsequently programmed data word or signal source results in an address field identical to that of a previously programmed data word or signal source, the RAM block output to the associated write control circuit prevents reprogramming of the associated memory location. Then during operation, application of that address field to the associated RAM block address input results in the associated RAM block output providing the identification or source number of the first-to-be programmed data word or signal source. However, subsequent RAM block levels within the pattern analyzer determine on the basis of the other field inputs which of the data words or signal sources having that address field is to be identified In operation of the system then, the field A-D signals are applied to the address inputs of first level RAM blocks 50a-50d, and the source or identification number stored at the addressed memory location is applied from the first level RAM block outputs to the address inputs of second level RAM blocks 52a, 52b. The source or identification number at the addressed location within those RAM blocks is then applied to the address input of third level RAM block 54, the output of which is the identification or source number of the identified signal source or digital word. FIG. 3 thus represents one implementation of the pattern analyzer 20 of FIG. 2.

If each first level signal analyzer 30a-30b, 50a-50d, is required to have an exact match of the input bits of its respective field in order to identify a possible signal source, then a signal source having non-varying parameters such as numerals printed on checks, can be identified. In numerous applications, however, the value of the parameter represented by an input field might vary. Thus, for example, in a voice actuated locking system at a secured entrance, the frequency of a particular individual's voice might vary from one occasion to the next.

If the first level pattern analyzer requires an exact match of the frequency in order to identify the voice, then the person seeking admission must always speak in exactly the same tone of voice. This, of course, is an impractical restriction on the system. A more practical approach is to determine the normal upper and lower limits of the value for each parameter and to identify a match as any input signal with its value for that parameter falling within the range defined by the upper and lower limits. Then, in FIG. 3, for example, the 16 bit input to a first level memory such as memory 50a, might represent two, or even three or more, parameters, such as frequency and a pattern characteristic within a specific word. If the frequency is permitted to be within a range of an upper frequency and a lower frequency, while the pattern is permitted to be within a suitable range, improved system operation results. In such event, each parameter might be considered as being required to fall within a "window" or range of values, and each first level memory 50a-50d performs a "window-addressable" memory (WAM) matching function.

A conventional WAM matches an input word with a stored value when each of the parameters in the input word falls between the lower and upper bounds stored in the WAM for each parameter. Each storage location has comparators for the upper and lower bounds of each input parameter. The bounds for one parameter do not depend on the value of any other parameter, so the matching is a function of only one parameter at a time. When multiple parameters make up the input field to a single memory block, the present invention can create a multivariable matching function as any desired function of these parameters. Thus the present invention includes, but is not limited to, the window-addressing matching ability.

A conventional WAM may attempt to recognize spurious patterns if an input parameter in the signature word is split between the input fields of separate comparators. The easiest way to avoid this is to hardwire each complete input parameter to the input field of a single, separate window comparator. One comparator can handle only one parameter.

The present pattern identifier may also attempt to recognize spurious patterns if a parameter is split between the input fields of separate memories or pattern analysers. The easiest way to avoid this is to hardwire one or more complete parameters to each separate memory block or pattern analyser. A more powerful and flexible means is to include as field selection logic 25 in FIG. 1 a set of programmable logic devices or configurations at the input of the pattern analyser. This allows the same hardware to process many different lengths and arrangements of the parameters in the input signature word, without requiring advance knowledge of what the parameter configuration will be.

Figure 5:
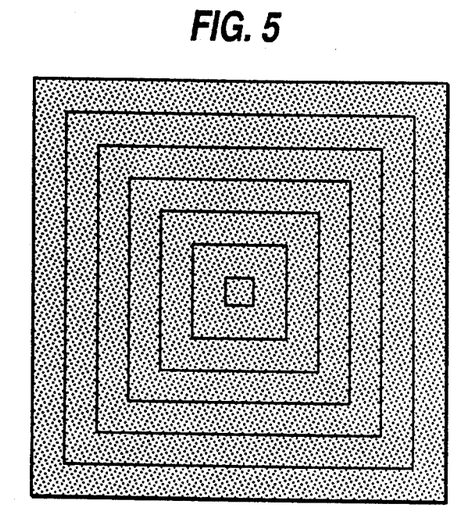
FIGS. 5 and 6 are diagrams useful in explaining operation of the present invention.

When there is only one parameter identified by a memory field input, each signal source has a contiguous range of parameter values that occupy a line segment in a one-dimensional space. When there are two parameters in a memory field input, they can be viewed as the axes of a two-dimensional plane. Each memory location corresponds to a unit square or a discrete cell in the area of this plane, with one parameter as a row address and the other as a column address. Due to measurement uncertainties and other factors, each source may have varying values for each parameter. Thus each source may occupy not just one cell in the plane, but varying regions as illustrated in FIG. 5.

With more than two parameters per memory field input, each signal source would occupy a volume or hypervolume in a multidimensional space. One parameter would be the index along each axis in this space, and each memory location would still be a cell.

With fixed upper and lower bounds on each parameter, each signal source boundary in a conventional WAM is strictly rectilinear because each one is a function of only one variable. However, with two or more parameters per memory field input, the present invention allows the contiguous area or volume of cells for each signal source to have any size and shape. This is possible because any group of memory locations can be programmed with a desired source number. The boundaries can be any function of the parameters that form the field input. In addition, more than one separate area can match the same source.

For example, suppose that separate "north-south" and "eastwest" locations make up one field input. Thinking of these as row and column addresses makes the plane of memory locations an exact geographical map of signal source locations. As shown in FIG. 5, each signal source occupies a region of cells on the map because of the location and/or measurement uncertainties. The present invention can provide circular or elliptical regions of location uncertainty, while conventional WAMs can only use rectangular boundaries.

To enable each first-level memory 30a-30d, 50a-50d in the pattern identifier circuit 20 to recognize each signal source, requires applying all of the valid field combinations for a source as address inputs to the memories, and storing the source number in the selected memory locations.

For each field combination, it is necessary to program the first-level memory block first, to provide address inputs for the second level memories. Each memory level is programmed in this sequence, until the output of the highest memory is the source number of the applied input pattern. So long as the memory levels are programmed in this sequence for any given input bit pattern, it is possible to program one level of memories either as a whole or in part before programming the higher levels.

Before programming the pattern identifier, all of the memories are cleared entirely to hold zeroes. Zero cannot be used as a source number, because it signifies locations that have never been programmed. During programming, source numbers are written only into locations holding a zero. Either hardware circuits or software code can detect the zero values and prevent writing a source number over a non-zero value.

With a single parameter per field, the source number would fill the locations in one contiguous range of memory locations, but with multiple parameters per field, the source number would fill the locations in a rectangle or volume in the multidimensional memory space.

The first level memory can be structured in the same way to recognize and distinguish multiple sources, so long as the rectangles or volumes for each possible signal source never overlap. When two or more sources overlap, one first level memory cannot distinguish the field values that these sources have in common, based on the fields at its inputs. The overall memory system must then combine the information from different first level memories and higher level memories to distinguish the signal sources.

Each overlap occupies a rectangle or volume in the memory space and corresponds to a set of two or more signal sources. If a unique set code is assigned to each distinct overlap set, higher memory levels could intersect the overlapping sets to identify particular signal sources. A unique set code per overlap set would retain the greatest ability to separate similar signal sources.

When there is only one parameter in a memory field input, there can only be twice as many distinct overlap sets as there are signal sources. This is because the first signal source creates one set, and each subsequent source can split one set with its upper boundary and another with its lower boundary. Thus it can split only two sets into only four and add only two set boundaries.

However, with multiple parameters per field, each successive source can split all of the previous single-source volumes or overlap volumes. By doubling the number of previous sets and adding one new one, the worst-case initial sequence is 1, $2 \times 1 + 1 = 3$, $2 \times 3 + 1 = 7$, $2 \times 7 + 1 = 15$, . . . or $2^{}1 - 1 = 1$, $2^{}2 - 1 = 3$, $2^{}3 - 1 = 7$, $2^{}4 - 1 = 15$, .. . For N sources there could be $2^{}N - 1$ different overlap sets. It would take N-bit set codes to uniquely identify all of the possible overlap sets for N signal sources. Two N-bit set codes form the 2N-bit address input field for each upper level memory block, requiring them to have $2^{}2N$ locations for only N sources. This exponential increase in memory size with the number of sources makes unique identification codes impractical.

Figure 6:
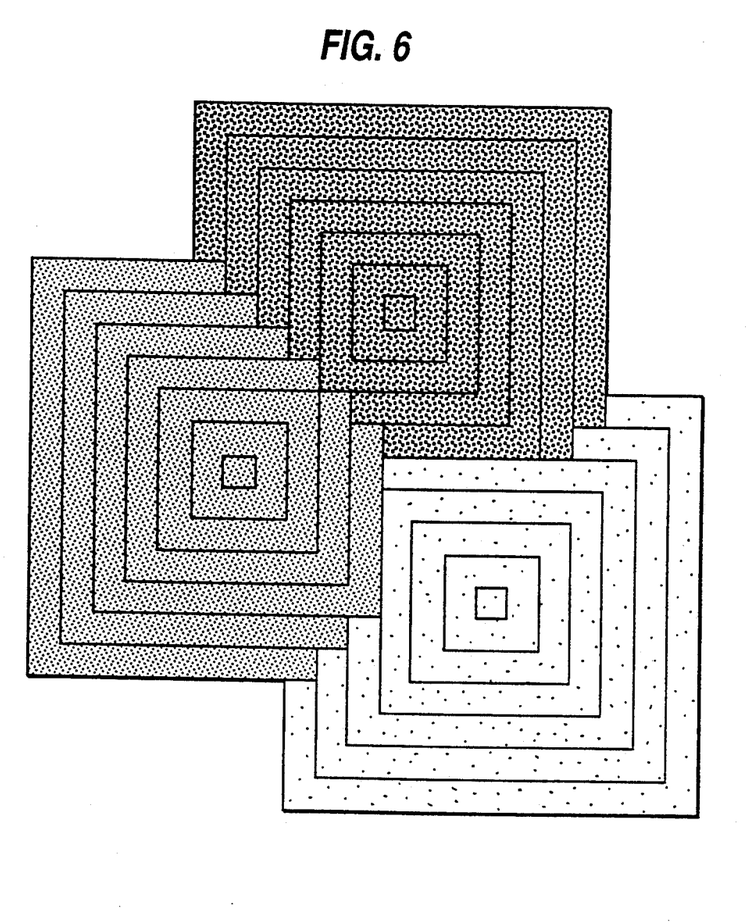

It is desirable to divide the first level memory space into a reasonable number of volumes with unique ID codes that help the second level memories distinguish among the possible signal sources. All of the possible overlap sets cannot be distinguished, but one approach is to cover the space with regions having areas or volumes that each surround the central cell of a signal source, and to program each region with the source's number. FIG. 6 uses different textures to represent the different source numbers stored in the cells of three overlapping regions. The central cell of a signal source can be the one closest to the center of all of the ranges of the signal source, or the most probable cell to occur.

Each region would include only cells of the central signal source. The regions would include both any non-overlapped cells of the central source and those overlap cells closer to the central cell of that source than to any other. All overlap cells would thus be included in the region of the overlapping signal source with the nearest center.

This approach automatically provides the finest resolution between signal sources where it is most important: in the regions where the central cells of the sources are most densely packed. Losing most of the distinctions between the different overlap sets does limit the first level memory resolution somewhat, but only between neighboring regions. Higher memory levels will recognize either source number for either signal source from the first level memory where two sources overlap.

The worst case would be two or more signal sources that overlap on every parameter in the entire signature word. This implies some overall bit patterns that could come from more than one source, which nothing can distinguish. With unique set codes for every overlap set, the second level memory could distinguish between the bit patterns that could be from only one signal source, or from only the other, or either one. Without overlap set codes, the only loss for this worst case is that the first level memories would identify all input values of the two signal sources as one type, instead of just some of those input values. The signal sources must be extremely similar for this to happen. An example of this might be the voices of identical twins, or two identical signal sources operated in the same way that are so close together that the ranges of all of their parameters overlap.

Even though there is some loss of resolution in each memory block, the entire second level memory may still be able to completely separate all non-worst-case signal sources. If there is any first-level memory block where a pair of sources do not overlap, the present pattern identifier as a whole will distinguish them. The exceptions can be detected while programming the pattern identifier, and it may be possible to reprogram some of the critical overlaps in the second memory level if some unique field codes are available. This could restore the maximum theoretical performance for a number of the worst overlapping cases, limited by the number of unique set codes not already used as source numbers.

Figure 4:
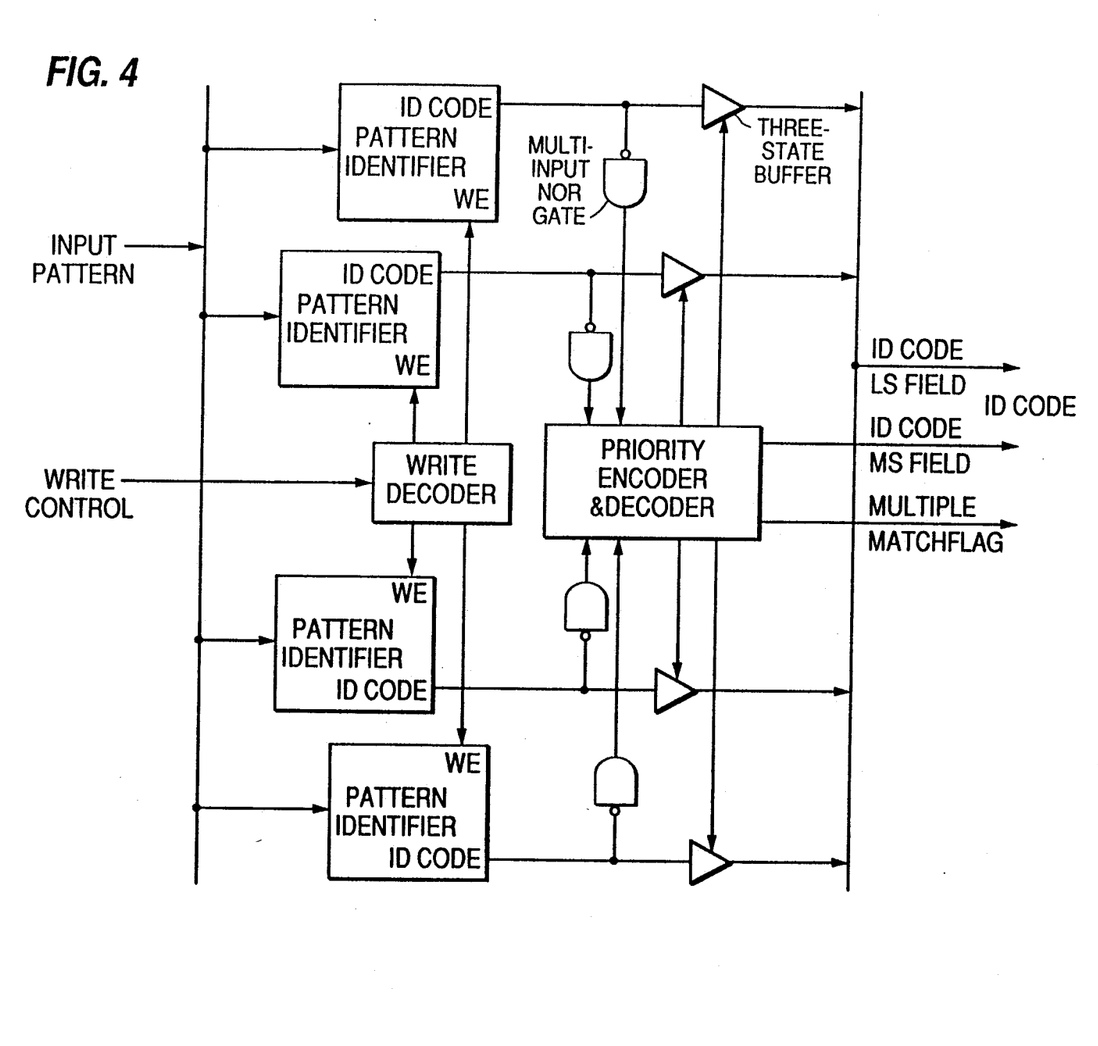
FIG. 4 is a block diagram of a further embodiment of depth expansion of a pattern identifier suitable for use in a system in accordance with the present invention.

The pattern identifier is a tree structure of memory blocks or pattern analysers, where the outputs of those lower in the tree make up the inputs of those at higher levels. A binary tree uses memory capacity most economically, but non-binary and nonsymmetric symmetric tree structures are possible. Since two K-bit source numbers make up the input of each upper level memory block, and zero is not a source number, a single tree structure whose upper level memory blocks have 2 K address bits can identify $2^{**}K - 1$ different sources. M such tree structures operating in parallel can thus identify $m^{*}(2^{**}K - 1)$ different sources. This expands the "depth" of the pattern identifier by M times. FIG. 4 shows fourfold depth expansion, which allows identification of four times as many sources or patterns. A priority encoder and decoder, or other suitable logic structures, can selectively enable the output of one tree structure that can identify an input pattern, if any. This logic can also output a match flag bit for any matches, and another flag bit for multiple matches.

This depth expansion by joining parallel tree structures at their outputs provides a second, better way to handle worst-case overlapping signal sources. Storing each of a group of similar sources in different tree structures avoids overlaps within the tree structures and thus in their first level memories. Each tree structure will then exactly recognize only one source out of the group. The tree structures that recognize a pattern in the group will then correspond exactly to the sources that the pattern could belong to.

In this respect the tree structures operate the same way as the locations in a conventional WAM. For a pattern belonging to more than one signal source, a priority encoder would enable one tree structure's output, just as it would select one memory location in a conventional WAM. Thus, either a conventional WAM or the pattern identifier recognizes the overlapping parameters as one of the possible signal sources in the overlapping group. Either one also provides a flag bit to indicate matches by multiple sub-memories.

For simplicity, two-dimensional examples will be used to illustrate this, as depicted in FIG. 6, with two parameter fields as the first level memory input, but the same principles apply to one- or multi-dimensional cases.

Consider cells where two signal sources overlap. One way to assign them to the source with the closest center would be to compute the equation of the line equidistant from the centers of the two sources. The corresponding inequality determines which side of the line a cell is on and hence to which source center it is closer. The cells assigned to each signal source must then satisfy both the range limits of each parameter and the proper inequality.

This method could be extended to more than two signal sources and overlaps, but the computations to find the nearest neighbors of all of the sources and detect overlaps without prior knowledge appear very long and complex. In addition, each cell of each signal source must be tested against a varying number of inequalities.

It would be much easier and faster to start by programming the central cell of each signal source first, then programming outward one thin shell at a time from the center for each source. This method automatically assigns overlap cells to the signal method with the closest center, with no computation of nearest neighbors, overlaps, equidistant lines or inequalities. It also lends itself to fast fixed-point calculations and hardware support. Just one cell could be programmed at a time for each signal source, but it seems more computationally efficient to program an entire shell at a time. By expanding the regions of all of the signal sources one small step radially outward at each iteration, each region grows outward at the same rate until it reaches its outer limits and/or overlaps with regions of other signal sources. The first source number in the overlap cells is left unchanged.

Cells equidistant from the two closest signal source centers will belong to the first one in the programming sequence, so the order does make a slight difference. For signal sources with separated centers, the difference is only $+/-\frac{1}{2}$ cell.

Instead of assigning cells to the source with the geometrically closest central point, it is also possible to assign them to the most probable source if the probability function of each source is known, as a function of the parameters in the signature word. This is equivalent to using probability as the distance measure in assigning cells to the closest source. The central cell is then the one most probable cell, and the expanding shells become descending probability contours.

For signal sources with the same central cell, the first one in the programming sequence will dominate. If the larger of the two concentric signal sources is programmed first, its source number will completely cover the other source. If the smaller concentric source is programmed first, there will be a concentric shell of the second parameter code surrounding the first. This yields better resolution for the smaller signal source, with no loss of resolution for the larger. A similar but lesser advantage occurs for any case where one region falls completely inside another. Therefore, it is best to program the sources with the smallest regions first.

The selection of the algorithm for which cells to program in the next outward shell can be made to implement the desired distance measure within the multidimensional parameter space of each first level memory. This determines the "closeness" measure for assigning cells to the signal source with the closest center. Likewise, the algorithm to determine the outer limits of each signal source region can be chosen to suit the application. For example, spherical shells with no outer limits might suit an application that needs strict nearest match classification. Since these choices are in software, one can program the same hardware for many different applications.

FIG. 6 shows a two-dimensional example of simple nearest neighbor matching with rectangular outer limits and square expanding shells for three overlapping signal sources. With square shells, the source boundaries follow vertical, horizontal or 45-degree diagonal lines. For non-overlapping emitters, the rectangular outer limits result in the same matching function as a conventional WAM.

There may be shortcuts, but the simplest way to program the pattern identifier is in expanding shells for all of the parameter values of all of the signal sources. The resulting algorithm is simpler because it does not depend on how the parameter fields are connected to the first level memory inputs.

The following are the pattern identifier programming algorithm variables:

```
; EN = SOURCE NUMBER
; PN = PARAMETER OR FIELD NUMBER
; NUM_PARAM = NUMBER OF SIGNATURE PARAMETERS OR FIELDS
; DONE_FLAG(I) = TRUE WHEN ENTIRE REGION FOR SOURCE I HAS BEEN
;     PROGRAMMED
; NUM_SOURCES = NUMBER OF SOURCES TO BE PROGRAMMED
; CAM_DONE = TRUE WHEN ALL SOURCES HAVE BEEN COMPLETELY PROGRAMMED
; U_LIM(I,J) = UPPER LIMIT OF SIGNATURE PARAMETER J FOR SOURCE I
; L_LIM(I,J) = LOWER LIMIT OF SIGNATURE PARAMETER J FOR SOURCE I
; U_NEXT(I,J) = NEXT HIGHER VALUE OF SIGNATURE PARAMETER J FOR SOURCE I
; L_NEXT(I,J) = NEXT LOWER VALUE OF SIGNATURE PARAMETER J FOR SOURCE I
; SIGNATURE_VAL = CURRENT SIGNATURE VALUE TO APPLY TO THE INPUTS
; EM_DONE(I) = TRUE WHEN ENTIRE REGION FOR SOURCE I HAS BEEN
;     PROGRAMMED
; U_DONE(I,J) = TRUE WHEN SOURCE I HAS BEEN PROGRAMMED TO THE
;     UPPER LIMIT OF PARAMETER J
; L_DONE(I,J) = TRUE WHEN SOURCE I HAS BEEN PROGRAMMED TO THE
;     LOWER LIMIT OF PARAMETER J
; WAM_OUT = SOURCE ID CODE FROM THE FINAL WAM OUTPUT STAGE
; CUR_VAL = THE FIXED VALUE OF ONE SIGNATURE FIELD DURING PROG_CAM
; CUR_PAR = THE # OF THE SIGNATURE FIELD HELD FIXED DURING PROG_CAM
; FLD_VAL = AN INDEX TO STEP THROUGH THE VALUES OF EACH SIGNATURE FIELD
```

Programming Algorithm PDL

```
BEGIN PROG_WAM
    {OPTIONAL} SORT THE SOURCE LIST WITH SMALLEST VOLUMES FIRST
    LOOP EN = 1 TO NUM_SOURCES
        LOOP PN = 1 TO NUM_PARAM
```

```
                    L_NEXT(EN,PN) = INT[(L_LIM(EN,PN) + U_LIM(EN,PN))/2]
                    U_NEXT(EN,PN) = L_NEXT(EN,PN)
                    FIELD PN OF SIGNATURE_VAL = L_NEXT(EN,PN)
            END LOOP
            APPLY SIGNATURE_VAL TO THE PATTERN IDENTIFIER
            PROGRAM ONE PATTERN IDENTIFIER LOCATION WITH ID CODE EN
    END LOOP
    DO
        CAM_DONE = TRUE
        LOOP EN = 1 TO NUM_SOURCES
            IF EM_DONE(EN) = FALSE THEN CALL NEXT_SHELL(EN)
            IF EM_DONE(EN) = FALSE THEN CAM_DONE = FALSE
        END LOOP
    UNTIL CAM_DONE = TRUE
END PROG_WAM

PROCEDURE NEXT_SHELL(EN)
    EM_DONE(EN) = TRUE
    LOOP PN = 1 TO NUM_PARAM
        IF U_NEXT(EN,PN) .LT. U_LIM(EN,PN) THEN
            U_NEXT(EN,PN) = U_NEXT(EN,PN) + 1
        END IF
        IF L_NEXT(EN,PN) .GT. L_LIM(EN,PN) THEN
            L_NEXT(EN,PN) = L_NEXT(EN,PN) - 1
        END IF
    END LOOP
    LOOP PN = 1 TO NUM_PARAM
        IF U_DONE(EN,PN) = FALSE THEN
            CALL PROG_CAM[EN,PN,U_NEXT(EN,PN),NUM_PARAM]
        END IF
        IF L_DONE(EN,PN) = FALSE THEN
            CALL PROG_CAM[EN,PN,L_NEXT(EN,PN),NUM_PARAM]
        END IF
        IF U_NEXT(EN,PN) .LT. U_LIM(EN,PN) THEN
            EM_DONE(EN) = FALSE
            U_DONE(EN,PN) = FALSE
        ELSE
            U_DONE(EN,PN) = TRUE
        END IF
        IF L_NEXT(EN,PN) .GT. L_LIM(EN,PN) THEN
            EM_DONE(EN) = FALSE
            L_DONE(EN,PN) = FALSE
        ELSE
            L_DONE(EN,PN) = TRUE
        END IF
    END LOOP
END NEXT_SHELL

RECURSIVE PROCEDURE PROG_CAM(EN,CUR_PAR,CUR_VAL,K)
    IF K .EQ. 0 THEN
        APPLY SIGNATURE_VAL TO THE PATTERN IDENTIFIER
        WAM_OUT = PATTERN IDENTIFIER OUTPUT
        IF WAM_OUT = 0 THEN
            PROGRAM ONE PATTERN IDENTIFIER LOCATION WITH ID CODE EN
        ELSE
            FLAG UNRESOLVED OVERLAP OF SOURCES WAM_OUT AND EN
        END IF
    ELSEIF K = CUR_PAR THEN
        FIELD K OF SIGNATURE_VAL = CUR_VAL
        CALL PROG_CAM(EN,PN,CUR_VAL,K-1)
    ELSE
        LOOP FLD_VAL = L_NEXT(EN,K) TO U_NEXT(EN,K)
            FIELD K OF SIGNATURE_VAL = FLD_VAL
            CALL PROG_CAM(EN,PN,CUR_VAL,K-1)
        END LOOP
    END IF
END PROG_CAM
```

The first outer loop in the main routine PROG_WAM calculates the central value of each signal source and stores it as the seed for the expanding shells. Then, it programs the pattern identifier for the central value. The Do UNTIL loop expands each signal source's shell outward until NEXT_SHELL sets its EM_DONE flag true. This indicates that the signal source's shell has reached the limits of the source's region. The algorithm is done when all of the EM_DONE flags are true and CAM_DONE is true.

PROG_WAM does not depend on the distance measure or the shape of the signal source regions or the shells. These are chosen in procedures NEXT_SHELL and PROG_CAM to suit the application. For example, for window addressing, NEXT_SHELL and PROG_CAM might construct rectilinear regions from initially square or cubical shells. Each side or face of the shell stops growing when it reaches the limits of the region.

At each iteration, the shell expands outward by one cell in the + and − directions of each parameter. The first loop in NEXT_SHELL updates the upper and lower limits of the shell along each parameter, unless they have already reached the region limits. Expanding parameter k to the next higher or lower value adds a sub-space to the region. Parameter k is held at the new value in the sub-space, while the other parameters vary within their new limits. This avoids reprogramming the interior of the shell at each iteration.

The second loop in NEXT—SHELL calls PROG—CAM to program the second level memories for these upper and lower subspaces for each parameter, unless they have already reached the region limits. Then it updates the done flags U—DONE and L—DONE for the + and − directions of each parameter and the done flag EMDONE for the signal source. EM—DONE becomes true when the shell has reached the region limits in all directions.

PROG—CAM could use a nested loop for each parameter, but a recursive procedure is simpler for several reasons. First, the recursive form does not depend on the number of parameters, which is unknown. The same code can serve multiple applications. Second, the code gets awkward and hard to read with too many nested loops. Third, it is very easy to handle the fixed parameter recursively, but would otherwise be awkward. The same recursive PROG—CAM procedure works, no matter which parameter is fixed.

PROG—CAM implements nested loops by calling itself from within the loop after the ELSE statement. For each value of the current parameter in this loop, it calls itself for all values of all of the subsequent parameters. The exception to this is that the two lines after the ELSEIF statement call PROG—CAM for only one value of the fixed parameter. K=1 in the loop when we come to the last parameter. All of the fields now have values. For each value of parameter 1, the loop calls PROG—CAM with k=0. In these cases the code after the IF statement applies the parameter to the second level memory to program a location. If the location has already been programmed, it flags the unresolved overlap to be handled as discussed above.

Although the present invention has been described with reference to preferred embodiments, rearrangements and substitutions could be made without departing from the scope of the invention.

What is claimed is:

1. A method of analyzing a multi-bit digital word to identify a known pattern in the word or a known signal or object on which parameters represented by the word were measured, said method comprising:
   (a) dividing the digital word into a plurality of multi-bit fields of digital bits, each field representative of at least one parameter of the known pattern, signal, or object;
   (b) analyzing each multi-bit field within the plurality of multi-bit fields to generate from each analyzed field an additional multi-bit field indicative of possible patterns, signals or objects each having a value for the associated parameter matching the value of the parameter represented by the analyzed multi-bit field;
   (c) grouping the multi-bit fields resulting from the previous step into at least one group of multi-bit fields;
   (d) analyzing each group of multi-bit fields resulting from the previous step to generate from each such group a further multi-bit field indicative of common patterns, signals, or objects among the possible patterns, signals, or objects indicated by the multi-bit fields of said each group;
   (e) repeating steps (c) and (d) until a single group of multi-bit fields is obtained; and
   (f) analyzing the single group of multi-bit fields to generate from the single group a final multi-bit field indicative of a common pattern, signal, or object among the possible patterns, signals, or objects indicated by the multi-bit fields of said single group, thereby identifying the known pattern, signal, or object.

2. A method of analyzing a multi-bit digital word to identify a known signal or object on which parameters represented by the word were measured, said method comprising:
   (a) dividing the digital word into a plurality of multi-bit fields of digital bits, each field representative of at least one parameter of the known signal or object;
   (b) analyzing the multi-bit fields based on each parameter to generate an additional multi-bit field indicative of possible signals or objects each having a range of values of the associated parameter within which the parameter represented by the analyzed multi-bit field falls;
   (c) grouping the multi-bit fields resulting from the previous step into at least one group of multi-bit fields;
   (d) analyzing each group of multi-bit fields resulting from the previous step to generate from each such group a further multi-bit field indicative of common signals or objects among the possible signals or objects indicated by the multi-bit fields of said each group;
   (e) repeating steps (c) and (d) until a single group of multi-bit fields is obtained; and
   (f) analyzing the single group of multi-bit fields to generate from the single group a final multi-bit field indicative of a common signal or object among the possible signals or objects indicated by the multi-bit fields of said single group, thereby identifying the known signal or object.

3. A method of analyzing a multi-bit digital word to identify a known signal or object on which parameters represented by the word were measured, said word comprising:
   (a) dividing the digital word into a plurality of multi-bit fields of digital bits, each field representative of at least one parameter of the known signal or object;
   (b) analyzing the multi-bit fields based on each parameter to generate an additional multi-bit field indicative of possible signals or objects each having at least one value of the associated parameter which most closely matches the parameter represented by the analyzed multi-bit field;
   (c) grouping the multi-bit fields resulting from the previous step into at least one group of multi-bit fields;
   (d) analyzing each group of multi-bit fields resulting from the previous step to generate from each such group a further multi-bit field indicative of common signals or objects among the possible signals or objects indicated by the multi-bit fields of said each group;
   (e) repeating steps (c) and (d) until a single group of multi-bit fields is obtained; and (f) analyzing the single group of multi-bit fields to generate from the single group a final multi-bit field indicative of a common signal or object among the possible signals or objects indicated by the multi-bit fields of said single group, thereby identifying the known signal or object.

4. A method as claimed in claim 1, 2, or 3 further comprising receiving an output of at least one sensor that measures characteristics of a signal or object; and processing the sensor output into a multi-bit digital signal to provide the multi-bit digital word.

5. A method as claimed in claim 4 further comprising converting the sensor output to a digital signal.

6. A method as claimed in claim 5 wherein the converting takes place before the processing.

7. A method as claimed in claim 5 wherein the processing takes place before the converting.

8. A method as claimed in claim 1, 2, or 3, further comprising receiving an output of at least one sensor that measures characteristics of a signal or object; and converting the sensor output to a digital signal to provide the multi-bit digital word.

9. A method as claimed in claim 1, 2, or 3 wherein each analyzing step generates a multi-bit field having the same number of digital bits.

10. A method as claimed in claim 1, 2, or 3 wherein each analyzing step comprises applying the multi-bit field to the address input of a memory to obtain a multi-bit field from the addressed memory location.

11. A method as claimed in claim 10 performed in a digital data processing unit.

12. A method as claimed in claim 1, 2, or 3 performed in a digital processing unit.

13. A method as claimed in claim 1, 2, or 3 wherein:
the first analyzing step comprises applying the multi-bit fields as the address inputs to a plurality of first programmable memory devices to obtain from addressed memory locations therein a plurality of first identification codes in the form of multi-bit fields and indicative of possible patterns, signals, or objects; and
each subsequent analyzing step comprises applying the identification codes obtained in the previous analyzing step as the address inputs to at least one further programmable memory device to obtain from at least one addressed memory location therein at least one second identification code in the form of a multi-bit field and indicative of common patterns, signals, or objects among the possible patterns, signals, or objects indicated by the identification codes obtained in the previous analyzing step.

14. A method as claimed in claim 13 performed in a digital data processing unit.

15. A system for analyzing a multi-bit digital word to identify a known pattern in the word or a known signal or object on which parameters represented by the word were measured, said system comprising:
(a) means for dividing the digital word into a plurality of multi-bit fields of digital bits, each field indicative of at least one parameter of the known pattern, signal, or object;
(b) first analyzing means for analyzing each multi-bit field within the plurality of multi-bit fields to generate from each analyzed field an additional multi-bit field indicative of possible patterns, signals, or objects each having a value for the associated parameter matching the value of the parameter represented by the analyzed multi-bit field;
(c) first grouping means for grouping the multi-bit fields obtained from said first analyzing means into at least one group of multi-bit fields;
(d) second analyzing means for analyzing the group of multi-bit fields obtained from said first grouping means to generate from that group a further multi-bit field indicative of a common pattern, signal, or object among the possible patterns, signals, or objects indicated by the multi-bit fields of said group, thereby identifying the known pattern, signal, or object.

16. A system as claimed in claim 15 wherein said second analyzing means comprises:
at least one set of additional analyzing means for analyzing the groups of multi-bit fields obtained from a grouping means to generate from each such group a multi-bit field indicative of common patterns, signals, or objects among the possible patterns, signals or objects indicated by the multi-bit fields of said each such group;
at least one set of additional grouping means for grouping the multi-bit fields obtained from said at least one set of additional analyzing means into at least one additional multi-bit field;
said additional analyzing means and additional grouping means being provided in sufficient sets to result in grouping of the multi-bit fields generated by a set of additional analyzing means into a single group of multi-bit fields; and
a final analyzing means for analyzing the single group of multi-bit fields to generate from the single group a final multi-bit field indicative of a common pattern, signal or object among the possible patterns, signals, or objects indicated by the multi-bit fields of said single group, thereby identifying the known pattern, signal, or object.

17. A system for analyzing a multi-bit digital word to identify a known signal or object on which parameters represented by the word were measured, said System A comprising:
(a) means for dividing the digital word into a plurality of multi-bit fields of digital bits, each field representative of at least one parameter of the known signal or object;
(b) first analyzing means for analyzing the multi-bit fields based on each parameter to generate an additional multi-bit field indicative of possible signals or objects each having a range of values of the associated parameter within which the parameter represented by the analyzed multi-bit field falls;
(c) first grouping means for grouping the multi-bit fields obtained from said first analyzing means into at least one group of multi-bit fields;
(d) second analyzing means for analyzing the group of multi-bit fields obtained from said first grouping means to generate from that group a further multi-bit field indicative of a common signal or object among the possible signals or objects indicated by the multi-bit fields of said group, thereby identifying the known signal or object.

18. A system as claimed in claim 17 wherein said second analyzing means comprises:
at least one set of additional analyzing means for analyzing the groups of multi-bit fields obtained from a grouping means to generate from each such group a multi-bit field indicative of common signals or objects among the possible signals or objects indicated by the multi-bit fields of said each group;

at least one set of additional grouping means for grouping the multi-bit fields obtained from said at least one set of additional analyzing means into at least one additional multi-bit field;

said additional analyzing means and additional grouping means being provided in sufficient sets to result in grouping of the multi-bit fields generated by a set of additional analyzing means into a single group of multi-bit fields; and a final analyzing means for analyzing the single group of multi-bit fields to generate from the single group a final multi-bit field indicative of a common possible signal or object among the possible signals or objects indicated by the multi-bit fields of said single group, thereby identifying the known signal or object.

19. A system for analyzing a multi-bit digital word to identify a known signal or object on which parameters represented by the word were measured, said system comprising:

(a) means for dividing the digital word into a plurality of multi-bit fields of digital bits, each field representative of at least one parameter of the known signal or object;

(b) first analyzing means for analyzing the multi-bit fields based on each parameter to generate an additional multi-bit field indicative of possible signals or objects each having at least one value of the associated parameter which most closely matches the parameter represented by the analyzed multi-bit field;

(c) first grouping means for grouping the multi-bit fields obtained from said first analyzing means into at least one group of multi—bit fields;

(d) second analyzing means for analyzing the group of multi-bit fields obtained from said first grouping means to generate from that group a further multi-bit field indicative of a common signal or object among the possible signals or objects indicated by the multi-bit fields of said group, thereby identifying the known signal or object.

20. A system as claimed in claim 19 wherein said second analyzing means comprises:

at least one set of additional analyzing means for analyzing the groups of multi-bit fields obtained from a grouping means to generate from each such group a multi-bit field indicative of common signals or objects among the possible signals or objects indicated by the multi-bit fields of said each group;

at least one set of additional grouping means for grouping the multi-bit fields obtained from said at least one set of additional analyzing means into at least one additional multi-bit field;

said additional analyzing means and additional grouping means being provided in sufficient sets to result in grouping of the multi-bit fields generated by a set of additional analyzing means into a single group of multi-bit fields; and a final analyzing means for analyzing the single group of multi-bit fields to generate from the single group a final multi-bit field indicative of a common signal or object among the possible signals or objects indicated by the multi-bit fields of said single group, thereby identifying the known signal or object.

21. A system as claimed in claim 15, 16, 17, 18, 19, or 20 further comprising means for receiving an output of at least one sensor that measures characteristics of a signal or object; and means for processing the sensor output into a multi-bit digital signal to provide the multi-bit digital word.

22. A system as claimed in claim 21 further comprising means for converting the sensor output to a digital signal.

23. A system as claimed in claim 15, 16, 17, 18, 19, or 20 further comprising means for receiving an output of at least one sensor that measures characteristics of a signal or object; and means for converting the sensor output to a digital signal to provide the multi-bit digital word.

24. A system as claimed in claim 15, 16, 17, 18, 19, or 20 wherein each analyzing means generates a multi-bit field having the same number of digital bits.

25. A system as claimed in claim 15, 16, 17, 18, 19, or 20 wherein each analyzing means is a digital memory.

26. A system as claimed in claim 25 implemented in a digital data processing unit.

27. A system as claimed in claim 15, 16, 17, 18, 19, or 20 implemented in a digital data processing unit.

28. A system as claimed in claim 15, 16, 17, 18, 19, or 20 wherein each analyzing means comprises a programmable memory device having a plurality of memory locations with addresses corresponding with the multi-bit fields and storing therein an identification code in the form of a multi-bit field and indicative of possible patterns, signals, or objects.

29. A system as claimed in claim 28 implemented in a digital data processing unit.

* * * * *